(12) United States Patent
Meng et al.

(10) Patent No.: US 11,262,618 B1
(45) Date of Patent: Mar. 1, 2022

(54) LED BACKLIGHT STRUCTURE AND MANUFACTURING METHOD THEREOF

(71) Applicant: BOE TECHNOLOGY GROUP CO., LTD., Beijing (CN)

(72) Inventors: Xianqin Meng, Beijing (CN); Weiting Peng, Beijing (CN); Yishan Tian, Beijing (CN); Qiuyu Ling, Beijing (CN); Yujiao Guo, Beijing (CN); Wei Wang, Beijing (CN); Fei Wang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/212,832

(22) Filed: Mar. 25, 2021

(30) Foreign Application Priority Data

Aug. 18, 2020 (CN) .......................... 202010830087.0

(51) Int. Cl.
*G02F 1/00* (2006.01)
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133607* (2021.01)

(58) Field of Classification Search
CPC .................................. G02F 1/133602–133607
See application file for complete search history.

(56) References Cited

U.S. PATENT DOCUMENTS

| | | | | |
|---|---|---|---|---|
| 2008/0007541 | A1* | 1/2008 | Eliasson | H03K 17/9638 345/176 |
| 2009/0073350 | A1* | 3/2009 | Toyama | G02F 1/133611 349/69 |
| 2010/0265694 | A1* | 10/2010 | Kim | G02B 6/0068 362/97.1 |
| 2010/0328574 | A1* | 12/2010 | Gourlay | G02B 6/0021 349/62 |
| 2011/0051411 | A1* | 3/2011 | Kim | G02F 1/133611 362/235 |
| 2011/0051412 | A1* | 3/2011 | Jeong | G02F 1/133603 362/235 |
| 2011/0228193 | A1* | 9/2011 | Shin | F21V 11/00 349/61 |

(Continued)

*Primary Examiner* — Gerald J Sufleta, II
(74) *Attorney, Agent, or Firm* — Houtteman Law LLC (57) ABSTRACT

The present disclosure relates to an LED backlight structure having a backlight side and a light outgoing side opposite to each other, including: an LED array on a transparent substrate; a transparent encapsulation layer on a side of the transparent substrate with the LED array, and configured to encapsulate the LED array; wherein the LED array is configured to emit light, the LED backlight structure further includes: a reflection layer on a backlight side of the transparent substrate and configured to reflect light to the light outgoing side; and a first microstructure layer on the light outgoing side of the transparent substrate and the LED array, wherein the first microstructure layer is configured to scatter light incident on a surface of the first microstructure layer, so that a part of light passes through the first microstructure layer, and the rest of light is reflected by the first microstructure layer.

20 Claims, 6 Drawing Sheets

(56) References Cited

U.S. PATENT DOCUMENTS

| | | | |
|---|---|---|---|
| 2012/0268963 A1* | 10/2012 | Gourlay | G02B 6/0021 |
| | | | 362/602 |
| 2013/0170218 A1* | 7/2013 | Wolk | G02B 6/0001 |
| | | | 362/296.01 |
| 2019/0094616 A1* | 3/2019 | Kim | G02B 6/0055 |
| 2019/0094619 A1* | 3/2019 | Park | G02F 1/133605 |
| 2019/0285950 A1* | 9/2019 | Liu | G02F 1/133606 |
| 2020/0081298 A1* | 3/2020 | Liao | G02F 1/133611 |
| 2020/0257035 A1* | 8/2020 | Kuksenkov | G02B 6/0031 |

\* cited by examiner

LED BACKLIGHT STRUCTURE AND MANUFACTURING METHOD THEREOF

CROSS REFERENCE TO RELATED APPLICATIONS

The present application claims the priority of the Chinese Patent Application with the Application No. 202010830087.0 filed on Aug. 18, 2020, the content of which is incorporated herein by reference in its entirety.

TECHNICAL FIELD

The present disclosure relates to the field of display backlight technology, in particular to an LED backlight structure and a manufacturing method thereof.

BACKGROUND

Because a utilization rate of a Liquid Crystal Display (LCD) is poor and liquid crystals have light leakage in different degrees, the LCD has a low contrast and high energy consumption. The plurality of LEDs may be arranged in an array and used as a direct type backlight, and the contrast may be improved and better display effect may be obtained by controlling on-off of a single LED and therefore controlling light locally. In the related art, the direct type LED backlight adopts a solution in which the LEDs emit light directly upwards. An LED array is provided at the bottom of a backlight source. Light is emitted from LEDs, and finally exits the structure uniformly by a reflecting sheet at the bottom, a diffuser and a brightness enhancement film on a surface. A thickness of the backlight source mainly depends on an optical distance OD (the distance between a surface of an LED package and a lower surface of a lower diffuser). Theoretically, the larger the OD is, the better the uniformity of the emitted light is. Therefore, in general, the direct type LED backlight realizes uniform light emission by increasing the thickness of the backlight structure.

SUMMARY

In an aspect, the present disclosure provides an LED backlight structure having a backlight side and a light outgoing side opposite to each other, the LED backlight structure including:
a transparent substrate;
an LED array on the transparent substrate, including a plurality of LEDs in an array;
a transparent encapsulation layer on a side of the transparent substrate with the LED array, and configured to encapsulate the LED array; wherein the LED array is configured to emit light,
the LED backlight structure further includes:
a reflection layer on a backlight side of the transparent substrate and configured to reflect light to the light outgoing side; and
a first microstructure layer on the light outgoing side of the transparent substrate and the LED array, wherein the first microstructure layer is configured to scatter light incident on a surface of the first microstructure layer, so that a part of light passes through the first microstructure layer, and the rest of light is reflected by the first microstructure layer;
wherein the transparent substrate is between the reflection layer and the first microstructure layer.

In an embodiment of the present disclosure, the first microstructure layer is an array of convex pyramids or an array of concave pyramids made of a transparent resin;
the array of convex pyramids includes a plurality of convex pyramids in an array, and the array of concave pyramids includes a plurality of concave pyramids in an array; and
tips of the convex pyramids face towards a light incidence direction, and recesses of the concave pyramids face towards the light incidence direction.

In an embodiment of the present disclosure, the reflection layer is on the backlight side of the transparent substrate, the reflection layer has a first via array of a plurality of first vias in one-to-one correspondence with the plurality of LEDs in the LED array, each LED in the LED array is within a respective one first via of the first via array, and the LEDs are configured to emit light to the light outgoing side of the LED backlight structure.

In an embodiment of the present disclosure, the LED backlight structure further includes a second microstructure layer between the reflection layer and the transparent substrate, wherein the second microstructure layer is configured to scatter light incident on a surface of the second microstructure layer, so that a part of the light passes through the second microstructure layer, and the rest of light is reflected by the second microstructure layer; the second microstructure layer has a second via array corresponding to the first via array, the plurality of first vias in the first via array are in one-to-one correspondence with a plurality of second vias in the second via array, and the plurality of first vias and the plurality of second vias are respectively overlapped with each other to form a plurality of stacked vias, and an LED in the LED array is in a corresponding one of the plurality of stacked vias.

In an embodiment of the present disclosure, the second microstructure layer is an array of convex pyramids or an array of concave pyramids made of a transparent resin;
the array of convex pyramids includes a plurality of convex pyramids in an array, and the array of concave pyramids includes a plurality of concave pyramids in an array; and
tips of the convex pyramids face towards a light incidence direction, and recesses of the concave pyramids face towards the light incidence direction.

In an embodiment of the present disclosure, the reflection layer is on a side of the transparent encapsulation layer distal to the transparent substrate, and the transparent substrate and the transparent encapsulation layer are both between the reflection layer and the first microstructure layer.

In an embodiment of the present disclosure, the LED backlight structure further includes a second microstructure layer between the reflection layer and the transparent encapsulation layer, wherein the second microstructure layer is configured to scatter light incident on a surface of the second microstructure layer, so that a part of the light passes through the second microstructure layer, and the rest of light is reflected by the second microstructure layer.

In an embodiment of the present disclosure, the first microstructure layer is on the other side of the transparent substrate without the LED array.

In an embodiment of the present disclosure, the LED backlight structure further includes a transflective film on a side of the first microstructure layer distal to the transparent substrate.

In an embodiment of the present disclosure, the reflection layer is on a side of the transparent substrate distal to the LED array, and the transparent substrate and the transparent encapsulation layer are both between the reflection layer and the first microstructure layer.

In an embodiment of the present disclosure, the first microstructure layer is on a side of the transparent encapsulation layer distal to the transparent substrate.

In an embodiment of the present disclosure, the LED backlight structure further includes a second microstructure layer between the reflection layer and the transparent substrate, wherein the second microstructure layer is configured to scatter light incident on a surface of the second microstructure layer, so that a part of the light passes through the second microstructure layer, and the rest of light is reflected by the second microstructure layer.

In an embodiment of the present disclosure, the LED backlight structure further includes a transflective film on a side of the first microstructure layer distal to the encapsulation layer.

In an embodiment of the present disclosure, a period of the array of convex pyramids or the array of concave pyramids is 50 μm±10 μm and a distance between adjacent LEDs in the LED array is 4 mm±0.4 mm.

In an embodiment of the present disclosure, the LED backlight structure further includes a quantum dot layer, a prism, an upper diffuser, and a window sticker sequentially provided on a side of the transflective film distal to the transparent encapsulation layer.

In an aspect, the present disclosure provides a method for manufacturing the above LED backlight structure, including forming the first microstructure layer on the light outgoing side of the transparent substrate and the LED array by an imprint process.

In an embodiment of the present disclosure, the method for manufacturing the LED backlight structure further includes forming a second microstructure layer on a side of the reflection layer proximate to the transparent substrate by the imprint process, wherein the second microstructure layer is configured to scatter light incident on a surface of the second microstructure layer, so that a part of the light passes through the second microstructure layer, and the rest of light is reflected by the second microstructure layer.

BRIEF DESCRIPTION OF DRAWINGS

The above and other features and advantages of the present disclosure will become more apparent by describing in detail exemplary embodiments thereof with reference to the drawings.

1. A transparent substrate; 2. a reflection layer; 3. a transparent encapsulation layer; 4. a lower diffuser; 5. a quantum dot layer; 6. a prism; 7. an upper diffuser; 8. a window sticker; 9. an LED array; 91. a first microstructure layer; 92. a second microstructure layer; 10. a transflective film; 11. a silicon wafer; 12. a photoresist; 13. a transparent resin material.

DETAIL DESCRIPTION OF EMBODIMENTS

Other objects, advantages and effects of the present disclosure will be understood by the following description of specific embodiments with reference to the accompanying drawings. In the drawings, the same or similar reference numerals refer to the same or similar parts or components.

To more clearly illustrate the objects, technical solutions and advantages of the present disclosure, embodiments of the present disclosure will be described in detail below with reference to the accompanying drawings. It is to be understood that the following description of the embodiments is intended to illustrate and explain the general concepts of the present disclosure and should not be taken as limiting the present disclosure. In the specification, the same or similar reference numerals refer to the same or similar parts or components.

Additionally, the drawings are not necessarily drawn to scale in order to clearly illustrate the present disclosure.

Figure 1:
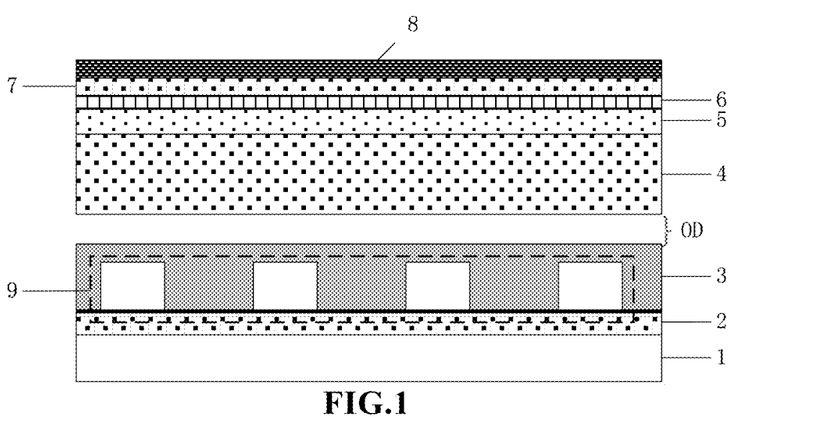
FIG. 1 is a schematic structural diagram of an LED backlight structure in the related art.

FIG. 1 is a schematic structural diagram of an LED backlight structure in the related art.

As shown in FIG. 1, an LED array 9 including a plurality of LEDs is disposed on a transparent substrate 1 and a reflection layer 2. Light emitted from the LEDs passes through a transparent encapsulation layer 3, an optical distance OD (distance between a surface of the LED package (i.e., an upper surface of the transparent encapsulation layer 3) and a lower surface of a lower diffuser 4), through the lower diffuser 4, and a quantum dot layer 5, and then is uniformly emitted. Theoretically, the greater the optical distance is, the better the uniformity of the light emitted from the lower diffuser 4 is. Therefore, the LED backlight structure shown in FIG. 1 may achieve uniform light emission by increasing a thickness of the backlight structure.

However, it demands for a display product to be light and thin in the market, which is contrary to the LED backlight structure in the related art. In order to achieve the lightness and thinness, for such the product in the market, the optical distance is generally reduced by reducing a distance between the LEDs, so as to achieve the lightness and thinness. However, in this technical solution, reducing the distance between the LEDs may increase the number of LEDs in the backlight, which not only increases the difficulty of chip transfer and wafer bonding of the LED chips, but also reduces the yield, and also increases the cost of the backlight and the power consumption of the final product.

In summary, the current direct type LED backlight cannot achieve objectives of reducing the process difficulty, the cost, the power consumption and realizing the lightness and thinness.

The inventor of the present disclosure improves the above LED backlight structure.

Figure 2:
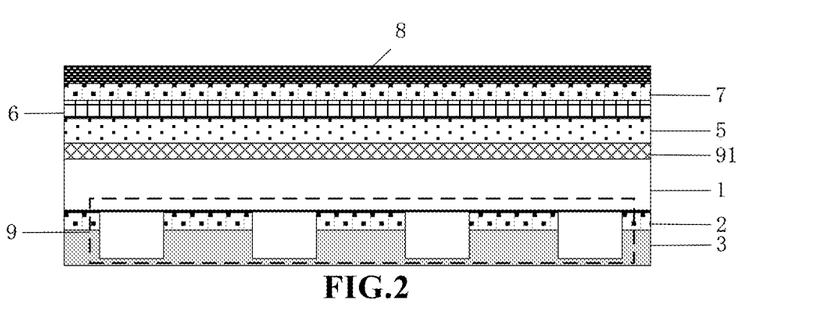
FIG. 2 is a schematic structural diagram of an LED backlight structure according to an embodiment of the present disclosure.

FIG. 2 is a schematic structural diagram of an LED backlight structure according to an embodiment of the present disclosure. As shown in FIG. 2, an LED backlight structure according to an embodiment of the present disclosure has a backlight side and a light outgoing side opposite to each other, and includes a transparent substrate 1; an LED array 9, disposed on the backlight side of the transparent substrate 1, and including a plurality of LEDs arranged in an array, and wherein the LED array 9 is configured to emit light in a direction of the light outgoing side; and a transparent encapsulation layer 3 on a side of the transparent substrate 1 having the LED array 9 for encapsulating the LED array 9. The LED backlight structure also includes a reflection layer 2 which is provided between the transparent substrate 1 and the transparent encapsulation layer 3, and the reflection layer 2 may reflect light to the light outgoing side of the LED backlight structure. The LED backlight structure also includes a first microstructure layer 91 on the transparent substrate 1 and located on the light outgoing side of the LED backlight structure, and configured to scatter light incident on a surface of the first microstructure layer 91, so that a part of light passes through the first microstructure layer 91, and the rest of light is reflected back to the transparent substrate 1. The reflection layer 2 is disposed on the transparent substrate 1 and located on the backlight side of the LED backlight structure, the reflection layer 2 is provided with a first via array of a plurality of first vias in one-to-one correspondence with the plurality of LEDs in the LED array 9. Each LED in the LED array 9 is disposed in a corresponding one of the first vias in the first via array. The LED is configured to emit light to the other side of the transparent substrate 1 where the reflection layer 2 is not disposed (i.e., a light outgoing side of the LED backlight structure). The transparent substrate 1 is located between the reflection layer 2 and the first microstructure layer 91. The LED array 9 emits light to the light outgoing side of the backlight structure, and the light arrives at the first microstructure layer 91 through the transparent substrate 1; the first microstructure layer 91 scatters the LED light, so that a part of the light is transmitted through the first microstructure layer 91, and the rest of the light is reflected; a part of light arrives at the reflection layer 2 through the transparent substrate 1; the light arriving at the reflection layer 2 is reflected to the first microstructure layer 91 again by the reflection layer 2, so that the light incident into the transparent substrate 1 from the LED array 9 is transmitted in an oscillating mode in the backlight structure to realize a multiple increase of an optical path, thereby realizing a better uniform light, and increasing the optical distance OD without reducing the distance between the LEDs in the LED array 9.

In the embodiment of the present disclosure, the transparent substrate 1 may be a PCB or glass. In the embodiment of the present disclosure, a thickness of the transparent encapsulation layer 3 is several tens of micrometers to several hundreds of micrometers, for example 200 μm to 300 μm. In the embodiment of the present disclosure, the reflection layer 2 is generally a metal reflection layer, and a material thereof is, for example, Al or Ag, and a thickness thereof needs to be equal to or greater than 100 nm. Optionally, the reflection layer 2 may be a multilayer reflection film, such as a high reflection film of ECR (3M). The material of the reflection layer 2 is not specially required here, as long as the reflectivity of the reflection layer 2 is as high as possible, such that the light incident on the surface may be completely reflected back into the transparent substrate 1. In the embodiment of the present disclosure, the first microstructure layer 91 may be directly disposed on the transparent substrate 1, or the first microstructure layer 91 may be disposed after a thin film, such as a SiNx thin film (with a thickness of 100 nm to 200 nm), is deposited on the transparent substrate 1. In the embodiment of the present disclosure, each LED may be a mini-LED, a Micro-LED with a smaller size, or a LED with a larger size, which is set according to the specific requirement. In the embodiment of the present disclosure, the LED is a light emitting source in an approximate Lambert mode.

In the embodiment of the present disclosure, the first microstructure layer 91 may include an angled light emitting surface to change a total reflection property of a surface of the transparent substrate 1 and change a direction of a total reflection surface, thereby forming dual effects of transmission and reflection.

The backlight structure further includes a plurality of optical film layers provided on a side of the first microstructure layer 91 distal to the transparent substrate 1, sequentially including a quantum dot layer 5, a prism 6, an upper diffuser 7 and a window sticker 8. In the embodiment of the present disclosure, the quantum dot layer 5 is configured to convert monochromatic light emitted by a monochromatic LED array into white light. Therefore, the quantum dot layer 5 is not strictly required and limited herein, as long as the color conversion is realized to convert the monochromatic light into the white light, and the quantum dot layer 5 has a small thickness as much as possible. In the embodiment of the present disclosure, the thickness of the quantum dot layer 5 is within 0.2 mm.

Optionally, if the LED array 9 in the backlight structure is a blue LED array 9, a white light LED array may be formed by covering a yellowish phosphor coating on the blue LEDs, thereby omitting the quantum dot layer 5. Similarly, if the LED array 9 may emit white light by other means, the quantum dot layer 5 may be omitted.

In the embodiment of the present disclosure, the prism 6 is obtained by integrating two orthogonal prism films, and is configured to adjust the light output from the light outgoing side of the backlight structure in a visible angle range in X-axis and Y-axis directions to further reduce the thickness of the backlight structure.

In the embodiment of the present disclosure, the window sticker 8 is used for shading the LED backlight structure, with a double-sided adhesive tape fixed at edges, and has advantages of anti-warping capability, impact resistance, high temperature resistance and die cutting process-ability, and a thickness of the window sticker 8 is not specially required. The window sticker 8 may adopt a black shading adhesive tape made of an ultrathin polyethylene terephthalate with a thickness of 0.05 mm, such that the flexibility of the adhesive tape is improved, and the adhesion strength, the shading effect and the temperature resistance are enhanced.

The lower diffuser 4 is generally thick, about 2 mm, and a thickness of the first microstructure layer 91 is typically set to 15 μm. Therefore, in this embodiment, the first microstructure layer 91 is used instead of the lower diffuser 4, so that the thickness of the LED backlight structure is greatly reduced. On the other hand, under a condition that the distance between the LEDs is not reduced, the backlight structure may also achieve a better light mixing effect.

Optionally, the first microstructure layer 91 is manufactured by a nanoimprint method.

Optionally, the first microstructure layer 91 is an array of convex pyramids. Specifically, the first microstructure layer 91 is a plurality of structures having a convex pyramid shape arranged in an array, the structures are arranged such that light is incident on a protruding side of the array of convex pyramids.

Figure 3:
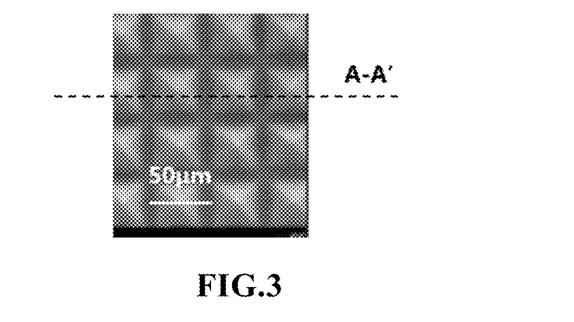
FIG. 3 is a scanning electron microscope of an array of convex pyramids of first and/or second microstructure layers according to an embodiment of the present disclosure.

FIG. 3 is a scanning electron microscope of an array of convex pyramids of the first microstructure layer 91 according to an embodiment of the present disclosure.

Figure 4:
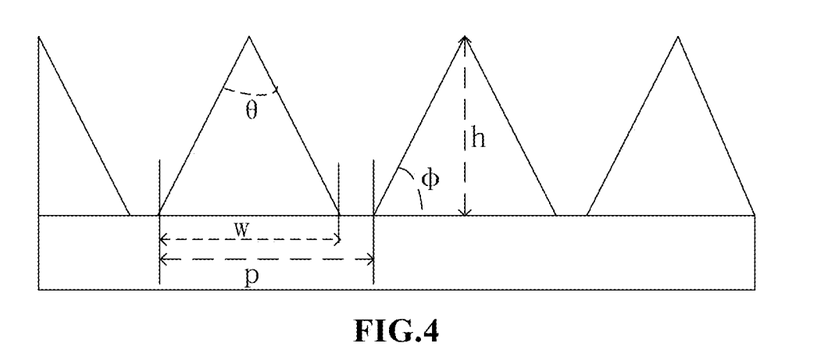
FIG. 4 is a schematic cross-sectional diagram of the array of convex pyramids of the first and/or second microstructure layers according to an embodiment of the present disclosure along a line A-A' as shown in FIG. 3.

FIG. 4 is a schematic cross-sectional diagram of the array of convex pyramids of the first microstructure layer 91 according to an embodiment of the present disclosure along a line A-A' as shown in FIG. 3.

Optionally, the array of convex pyramids has a period (P) of 50 μm±10 μm, a base angle (φ) of 45°±15°, a height (h) of 22 μm±3 μm, an apex angle (θ) of 90°±15°, and a duty cycle of ff=w/P of 85% to 100%. The period of the array of convex pyramids in FIG. 3 is 50 μm. In the embodiment of the present disclosure, the duty cycle here mainly refers to a ratio of the size of each convex pyramid to the period. In the embodiment of the present disclosure, the period refers to a distance between corresponding sides of any two adjacent of convex pyramids in the array of convex pyramids.

Figure 5A:
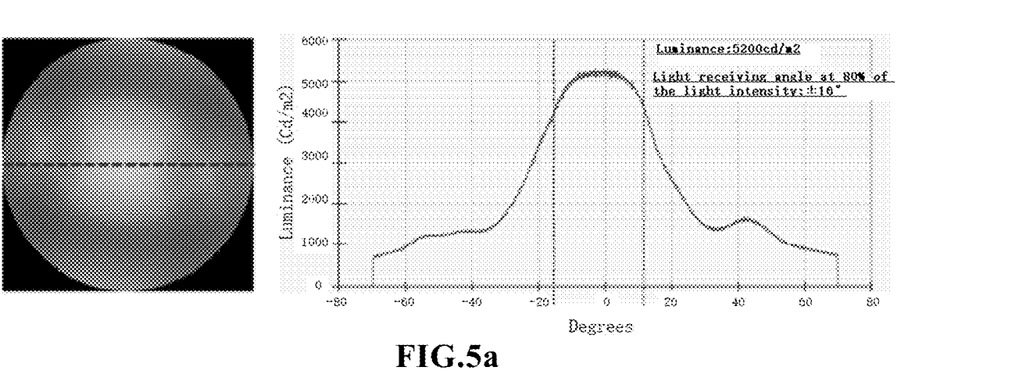
FIG. 5a is a diagram illustrating an actual effect and light output angle spectrum distribution of the LED backlight structure in the related art shown in FIG. 1.
Figure 5B:
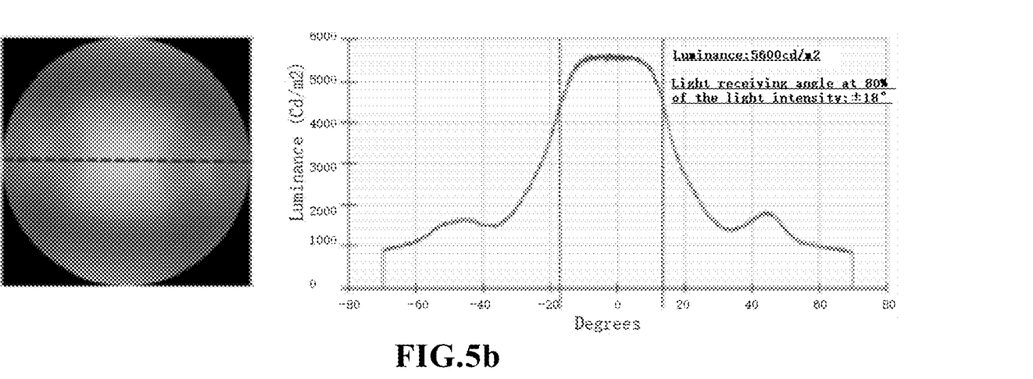
FIG. 5b is a diagram illustrating an actual effect and light output angle spectrum distribution of an LED backlight structure according to an embodiment of the present disclosure, in which a lower diffuser in the LED backlight structure shown in FIG. 1 is replaced by the first microstructure layer with the array of convex pyramids.

FIG. 5a is a diagram illustrating an actual effect and light output angle spectrum distribution of the LED backlight structure in the related art shown in FIG. 1. FIG. 5b is a diagram illustrating an actual effect and light output angle spectrum distribution of an LED backlight structure according to an embodiment of the present disclosure, in which a lower diffuser in the LED backlight structure shown in FIG. 1 is replaced by the first microstructure layer with the array of convex pyramids.

In the backlight structure using the lower diffuser 4 shown in FIG. 1, a maximum luminance of 5200 cd/m² is obtained after the light emitted from the LED array 9 passes through the quantum dot layer 5, two diffusers, and two prisms 6. As shown in FIG. 5a, the light output angle spectrum distribution is sectioned at a centrosymmetric position such that a distribution of light intensity at different angles may be seen, and a light receiving angle at 80% of the light intensity may be seen to be ±16°. In the LED backlight structure using the array of convex pyramids shown in FIG. 2, as shown in FIG. 5b, for a light output angle spectrum distribution measured in the case where the lower diffuser 4 is replaced with the first microstructure layer 91 using the array of convex pyramids, a central luminance is 5600 cd/m², a light receiving angle at 80% of the light intensity is around ±18°. For the display of the rear-end stacked panel, the backlight light effect is higher, and the region with higher central luminance is increased by the light receiving angle of 4° (=2*(18°−16°)), and the luminance is increased by 7.7% (=(5600−5200)/5200).

Optionally, the first microstructure layer 91 may be an array of concave pyramids. Specifically, the first microstructure layer 91 is a plurality of structures having a concave pyramid shape arranged in an array, the structures are arranged such that light is incident on a side of the structures having recesses.

Figure 6:
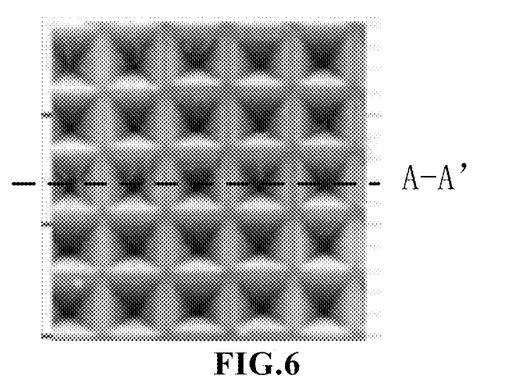
FIG. 6 is a scanning electron microscope of an array of concave pyramids of the first and/or second microstructure layers of the LED backlight structure according to an embodiment of the present disclosure.

FIG. 6 is a scanning electron microscope of an array of concave pyramids of the first microstructure layer 91 of the LED backlight structure according to an embodiment of the present disclosure.

Figure 7:
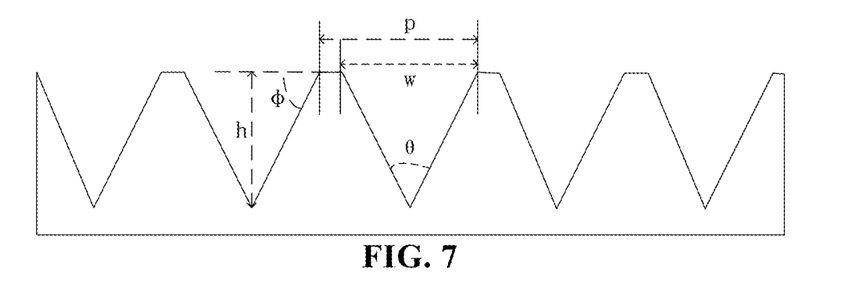
FIG. 7 is a schematic cross-sectional diagram of the array of concave pyramids of the first and/or second microstructure layers according to an embodiment of the present disclosure along a line A-A' shown in FIG. 6.

FIG. 7 is a schematic cross-sectional diagram of the array of concave pyramids of the first microstructure layer 91 according to an embodiment of the present disclosure along a line A-A' shown in FIG. 6.

Optionally, the array of concave pyramids has a period (P) of 50 μm±10 μm, a base angle (φ) of 45°±6°, a height (h) of 15 μm±5 μm, an apex angle (θ) of 90°±15°, and a duty cycle of ff=w/P of 85% to 100%.

In the LED backlight structure using the array of concave pyramids, the central luminance may be further increased to 5800 cd/m², and the luminance is increased by 11.5%. Compared with the backlight structure shown in FIG. 1, the light receiving angle is also improved.

The existence of the first microstructure layer 91 and the reflection layer 2 which are provided at two sides of the transparent substrate 1 enables light entering the transparent substrate 1 to be transmitted in an oscillating mode in the transparent substrate, realizing a multiple increase of an optical path, thereby realizing a better uniform light, and increasing the distance between LEDs. Further, the LED array 9 is encapsulated on the light outgoing side of the LED backlight structure, and the LED array 9 is configured to emit light to the light outgoing side, such that the transparent substrate 1 not only serves as a substrate of the LED array 9, but also serves as a medium for light transmission. A transmission distance of light in the transparent medium is increased through the transparent surface and back micronano structures, such that most of incident light is transmitted in the transparent substrate 1 serving as a light guide plate in the oscillating mode, reducing the number of LEDs, achieving a uniform light emission in a large area, and reducing power consumption accordingly.

When the first microstructure layer 91 employs the array of convex pyramids or the array of concave pyramids, the period of the array of convex pyramids or the array of concave pyramids is 50 μm±10 μm. In the embodiment of the present disclosure, the distance between adjacent LEDs in the LED array 9 (the distance between center points of two adjacent LED chips) is 4 mm±0.4 mm.

Figure 8:
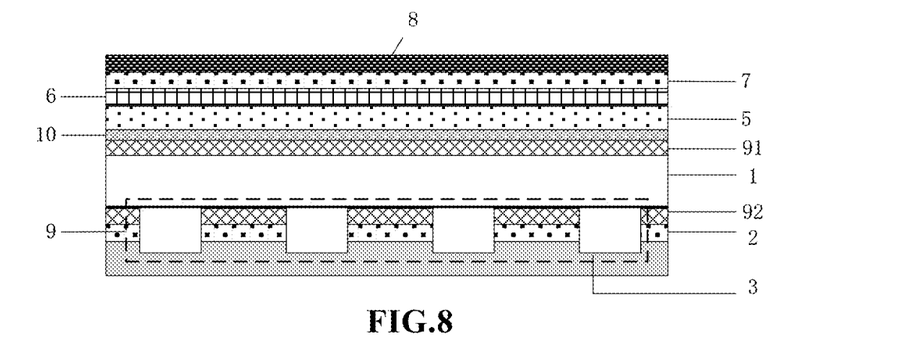
FIG. 8 is a schematic structural diagram of an LED backlight structure according to an embodiment of the present disclosure.

In the embodiment of the present disclosure, the first microstructure layer 91 employs the array of convex pyramids or the array of concave pyramids, but the present disclosure is not limited thereto. In other embodiments of the present disclosure, the first microstructure layer 91 may include a rough surface. FIG. 8 is a schematic structural diagram of an LED backlight structure according to an embodiment of the present disclosure.

A difference between the LED backlight structure having the first microstructure layer 91 provided by the embodiment shown in FIG. 2 and the LED backlight structure provided by this embodiment will be mainly described below. The description of the same will be omitted for the sake of brevity, wherein like reference numerals refer to like parts.

As shown in FIG. 8, on the basis of the LED backlight structure in the embodiment shown in FIG. 2, optionally, a second microstructure layer 92 is disposed between the reflection layer 2 and the transparent substrate 1, the second microstructure layer 92 may scatter light incident on a surface thereof, so that a part of the incident LED light may pass through the second microstructure layer 92, and the rest of the incident LED light is reflected by the second microstructure layer 92. The second microstructure layer 92 is provided with a second via array corresponding to the first via array, the plurality of first vias in the first via array are in one-to-one correspondence with a plurality of second vias in the second via array, and the plurality of first vias and the plurality of second vias are respectively overlapped with each other to form a plurality of stacked vias, and an LED is disposed in a corresponding one of the plurality of stacked vias. The second microstructure layer 92 further scatters the light arriving at the second microstructure layer 92.

Optionally, the second microstructure layer 92 may be the array of convex pyramids or the array of concave pyramids, and the specific structure of the array of convex pyramids and the array of concave pyramids may be the same as that described in the embodiment of FIG. 2. In other embodiments of the present disclosure, the first and second microstructure layers 91, 92 may have a rough surface or include an array of random convex pyramids whose period is disordered and the convex pyramids are randomly arranged.

Optionally, a transflective film 10 is provided on a side of the first microstructure layer 91 distal to the transparent substrate 1. The transflective film 10 transmits a portion of light incident on its surface and reflects the rest of light. In the embodiment of the present disclosure, the transflective film 10 may be a film that reflects 50% and transmits 50% of incident light, and may be a thin film alternately grown with high and low refractive indexes, such as glass/(ZnS/MgF2/ZnS)/SiO2, (ZnS having a refractive index of 2.35, MgF2 having a refractive index of 1.38), and having a thickness of $\lambda/4$, that is, a thickness of each layer is related to a target light emitting wavelength ($\lambda$).

After the second microstructure layer 92 and/or transflective film 10 are/is provided, light emitted from the LEDs may oscillate more sufficiently in the LED backlight structure, so that a sufficient light mixing effect is further achieved, uniformity of light emission may be further improved, and the distance between adjacent LEDs may be further increased.

A difference between the LED backlight structure having the first microstructure layer 91 provided by the embodiment shown in FIG. 2 and the LED backlight structure provided by this embodiment will be mainly described below. The description of the same will be omitted for the sake of brevity, wherein like reference numerals refer to like parts.

Figure 9:
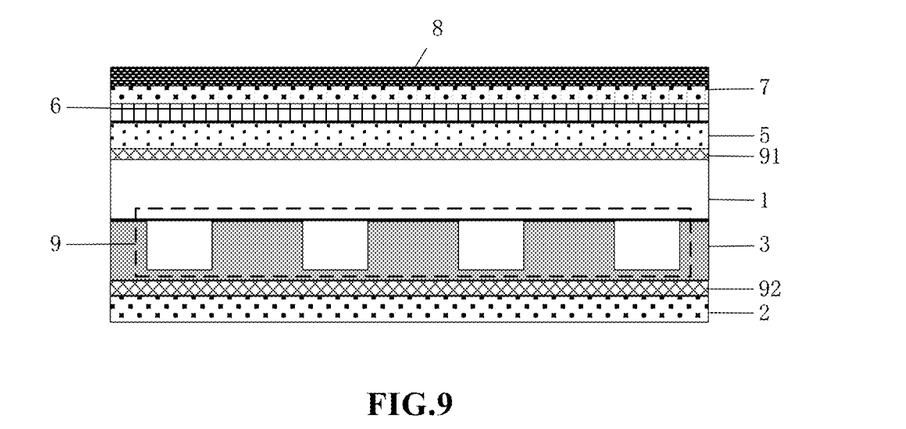
FIG. 9 is a schematic structural diagram of an LED backlight structure according to an embodiment of the present disclosure.

FIG. 9 is a schematic structural diagram of an LED backlight structure according to an embodiment of the present disclosure.

As shown in FIG. 9, the LED backlight structure of the present embodiment differs from the LED backlight structure of the embodiment of FIG. 2 in that: in the LED backlight structure of the present embodiment, the transparent encapsulation layer 3 is disposed between the reflection layer 2 and the transparent substrate 1, and the LED array 9 is configured to emit light to a side distal to the reflection layer 2.

In the LED backlight structure of the embodiment according to the present disclosure, the light emitted from the LED to a side distal to the reflection layer 2 may be scattered and be reflected through respective layers and back to a side of the transparent substrate 1 where the LED array 9 is disposed, and because an area in the LED array 9 where the LEDs are not disposed is large (generally, the area without the LEDs disposed is above approximately 80%), light arriving at the side of the transparent substrate 1 where the LED array 9 is disposed may pass through the area without the LEDs disposed, pass through the transparent encapsulation layer 3, arrive at the reflection layer 2, and then reflected by the reflection layer 2 to a side of the LED backlight structure distal to the reflection layer 2, and thus, the light may be emitted uniformly through multiple oscillating cycles. Also, the transparent encapsulation layer 3 may be effectively utilized, such that the optical path is longer, the uniformity of light is increased, and the light mixing is achieved without reducing the distance between the LEDs. In the embodiment of the present disclosure, the area where the LEDs are not disposed may be provided with traces for the driving circuit.

Optionally, a second microstructure layer 92 is disposed between the reflection layer 2 and the transparent encapsulation layer 3, and the second microstructure layer 92 may scatter light incident on a surface thereof, so that a part of the incident LED light may pass through the second microstructure layer 92, and the rest of the incident LED light is reflected by the second microstructure layer 92.

Optionally, a transflective film 10 is provided on a side of the first microstructure layer 91 distal to the transparent substrate 1.

Optionally, the first microstructure layer 91 and/or the second microstructure layer 92 may be the array of convex pyramids or the array of concave pyramids, and the specific structure of the array of convex pyramids and the array of concave pyramids may be the same as that described in the embodiment of FIG. 2. For the array of convex pyramids, light is incident on a protruding side of the array of convex pyramids. For the array of concave pyramids, light is incident on a side of the structure having recesses.

Figure 10:
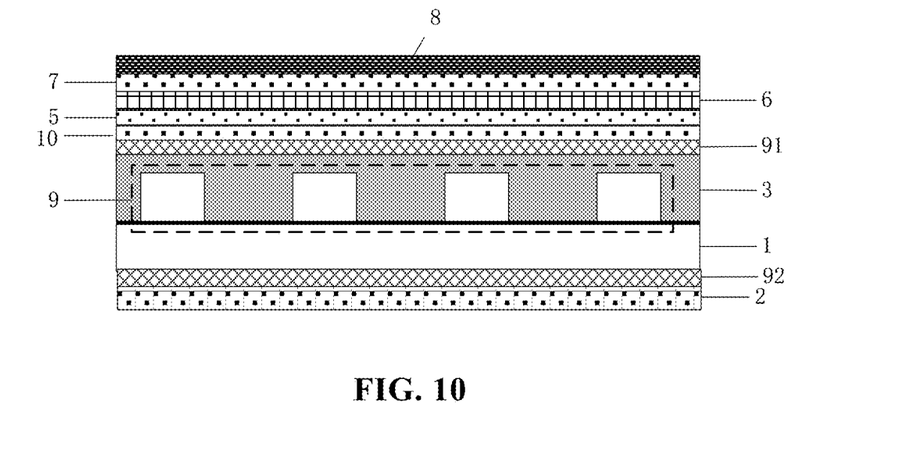
FIG. 10 is a schematic structural diagram of an LED backlight structure according to an embodiment of the present disclosure.

FIG. 10 is a schematic structural diagram of an LED backlight structure according to an embodiment of the present disclosure. As shown in FIG. 10, the LED backlight structure includes a transparent substrate 1; an LED array 9 bonded on the transparent substrate 1; a transparent encapsulation layer 3 located on a side of the transparent substrate 1 having the LED array 9 for encapsulating the LED array 9; a reflection layer 2 disposed on a surface of the transparent substrate 1 distal to the LED array 9, and wherein the LEDs are configured to emit light to the reflection layer 2, the reflection layer 2 may reflect the incident LED light to the light outgoing side of the LED backlight structure; a first microstructure layer 91 provided on a surface of the transparent encapsulation layer 3 distal to the transparent substrate 1, and wherein the first microstructure layer 91 may scatter light incident on a surface of the first microstructure layer 91, so that a part of incident LED light may transmit through the first microstructure layer 91, and the rest of incident LED light is reflected by the first microstructure layer 91. The transparent substrate 1 is located between the reflection layer 2 and the first microstructure layer 91.

The LED array 9 emits light to the reflection layer 2, and LED light arrives at the reflection layer 2 through the transparent substrate 1, and the LED light is reflected by the reflection layer 2. The reflected light passes through the transparent substrate 1 and the transparent encapsulation layer 3 again and arrives at the first microstructure layer 91, a part of the light is scattered and transmitted, and the rest of the light is reflected again. The light reflected by the first microstructure layer 91 arrives at the reflection layer 2 again through the transparent encapsulation layer 3 and the transparent substrate 1. Thus, light incident into the transparent substrate from the LED array 9 is transmitted in the oscillating mode in the backlight structure, such that a multiple increase of an optical path is achieved, thereby realizing a uniform light and increasing the distance between LEDs. Further, the LED array 9 is directly encapsulated on the transparent substrate 1, so that the transparent substrate not only serves as a substrate of the LED array 9, but also serves as a light transmission medium, such that a transmission distance of light in the transparent medium is increased, and most of incident light is transmitted in the oscillating mode in the light guide plate, such that a uniform light emission in a large area is achieved, the distance between LEDs does not need to be reduced, and the power consumption is reduced accordingly.

Optionally, a second microstructure layer 92 may be disposed between the reflection layer 2 and the transparent substrate 1, and the second microstructure layer 92 may scatter light incident on a surface thereof, so that a part of the incident LED light may pass through the second microstructure layer 92, and the rest of the incident LED light is reflected by the second microstructure layer 92.

Optionally, the first microstructure layer 91 and/or the second microstructure layer 92 may be the array of convex pyramids or the array of concave pyramids, and the specific structure of the array of convex pyramids and the array of concave pyramids may be the same as that described in the embodiment of FIG. 2.

Optionally, a transflective film 10 is provided on a side of the first microstructure layer 91 distal to the transparent substrate 1.

The LED backlight structure adopts the first microstructure layer 91 and/or the second microstructure layer 92 instead of the lower diffuser 4 in the LED structure in the related art, the lower diffuser 4 in the structure in the related art is generally thicker, which is about 2 mm, and the first microstructure layer 91 and the second microstructure layer 92 are usually set to be 15 μm. As may be seen, the backlight structure described in this disclosure has a substantially reduced thickness compared to the backlight structure in the related art. On the other hand, without reducing the distance between the LEDs, the LED backlight structure may also achieve a better light mixing effect.

The present disclosure also provides a manufacturing method for the LED backlight structure. The first microstructure layer 91 and/or the second microstructure layer 92 are manufactured by an imprint process (e.g., a nanoimprint process).

FIGS. 11a to 11g are schematic diagrams illustrating steps and resultant structures in a method for forming a first microstructure layer and/or a second microstructure layer in an LED backlight structure provided by the present disclosure.

Figure 11A:
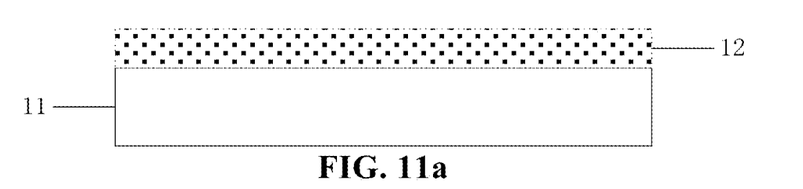
FIGS. 11a to 11g are schematic diagrams illustrating steps and resultant structures in a method for forming a first microstructure layer and/or a second microstructure layer in an LED backlight structure provided by the present disclosure.
Figure 11B:
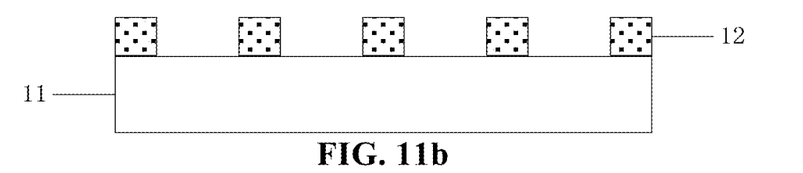
Figure 11C:
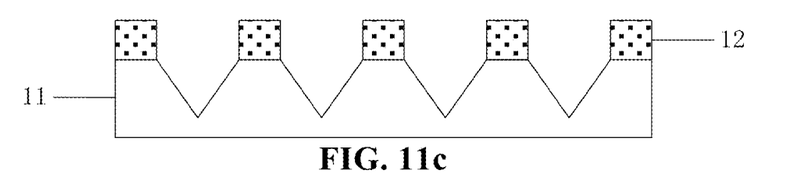
Figure 11D:
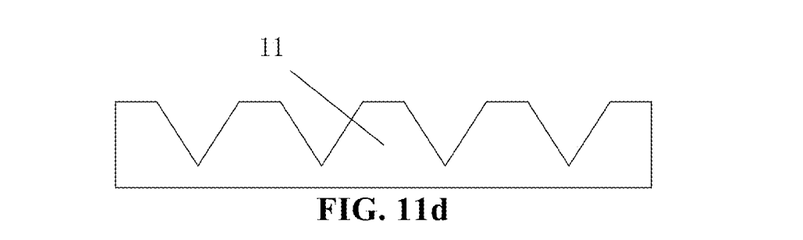
Figure 11E:
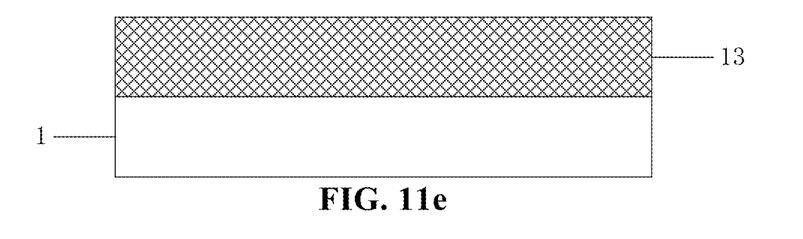
Figure 11F:
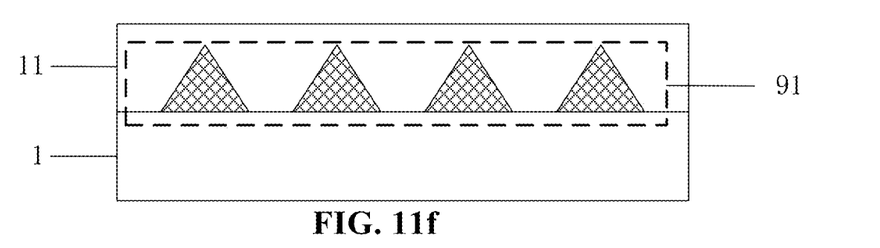
Figure 11G:
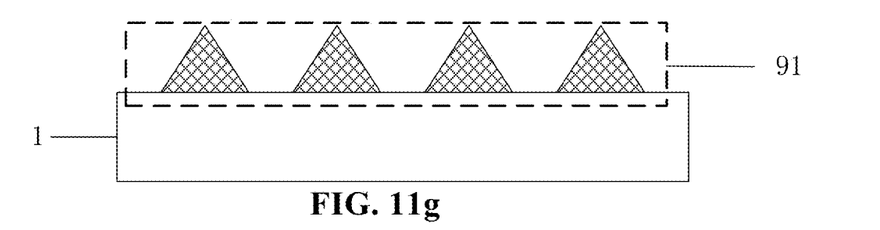

The specific steps of forming the first microstructure layer 91 by using the nanoimprint process will be specifically described below by taking an example in which the first microstructure layer 91 is the array of convex pyramids and is formed on a side of the transparent substrate 1. The method for forming a first microstructure layer and/or a second microstructure layer in an LED backlight structure provided by the present disclosure includes steps of:

Step 1, spin-coating a layer of photoresist 12 on a silicon wafer 11, as shown in FIG. 11a;

Step 2, writing a designed superstructure surface primitive pattern by using an electron beam lithography method, and developing the written pattern by using a developing solution, as shown in FIG. 11b;

Step 3, performing wet etching on the silicon wafer 11 by using the developed photoresist 12 as a mask to form recesses for manufacturing a structure having convex pyramids, as shown in FIG. 11c;

Step 4, removing the photoresist 12 by using a corresponding solvent to obtain the silicon wafer 11 which may be used as an imprint template, as shown in FIG. 11d;

Step 5, coating a layer of transparent resin material 13 on a surface of the transparent substrate 1, as shown in FIG. 11e;

Step 6, imprinting the transparent resin material 13 coated in Step 5 by using the imprint template manufactured in Step 4, so that the transparent resin material 13 forms convex pyramids, as shown in FIG. 11f;

Step 7, removing the imprint template to obtain the transparent substrate 1 with the convex pyramids on the surface, as shown in FIG. 11g.

Figure 12:
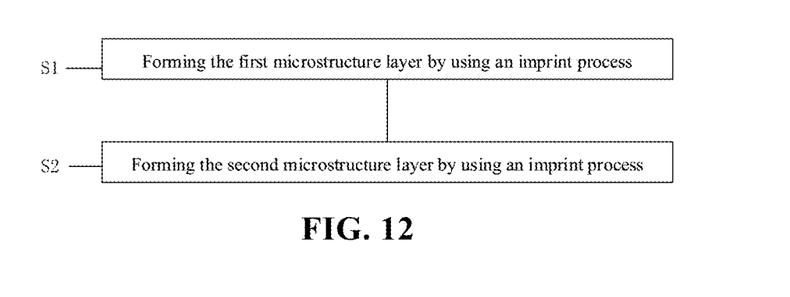
FIG. 12 shows a flow chart of a method of manufacturing an LED backlight structure according to an embodiment of the present disclosure.

FIG. 12 shows a flow chart of a method of manufacturing an LED backlight structure according to an embodiment of the present disclosure. As shown in FIG. 12, the method for manufacturing the LED backlight structure includes the following two steps:

S1: forming the first microstructure layer by using the imprint process;

S2: forming the second microstructure layer by using the imprint process.

In the embodiment of the present disclosure, a similar method may also be used to form the array of concave pyramids. In other embodiments of the present disclosure, the first microstructure layer and the second microstructure layer having rough surfaces may also be formed. Specifically, the rough surfaces may be formed by a master imprint process, or directly by mechanical grinding or dry etching or wet etching.

In the embodiment as shown in FIG. 10, the first microstructure layer 91 may also be formed on the transparent encapsulation layer 3 by using the same method as above. In other embodiments of the present disclosure, the second microstructure layer 92 may also be formed on the corresponding layer by using the same method as above.

It will be understood that the above embodiments are merely exemplary embodiments adopted to illustrate the principles of the present disclosure, and the present disclosure is not limited thereto. It will be apparent to those skilled in the art that various changes and modifications may be made without departing from the spirit and scope of the present disclosure, and these changes and modifications are to be considered within the scope as defined in the claims.

What is claimed is:

1. An LED backlight structure, having a backlight side and a light outgoing side opposite to each other, the LED backlight structure comprising:
   a transparent substrate;
   an LED array on the transparent substrate, comprising a plurality of LEDs in an array;
   a transparent encapsulation layer on a side of the transparent substrate with the LED array, and configured to encapsulate the LED array; wherein the LED array is configured to emit light,
   the LED backlight structure further comprises:
   a reflection layer on a backlight side of the transparent substrate and configured to reflect light to the light outgoing side; and
   a first microstructure layer on the light outgoing side of the transparent substrate and the LED array, wherein the first microstructure layer is configured to scatter light incident on a surface of the first microstructure layer, so that a part of light passes through the first microstructure layer, and the rest of light is reflected by the first microstructure layer;

wherein the transparent substrate is between the reflection layer and the first microstructure layer.

2. The LED backlight structure according to claim 1, wherein the first microstructure layer is an array of convex pyramids or an array of concave pyramids made of a transparent resin;

the array of convex pyramids comprises a plurality of convex pyramids in an array, and the array of concave pyramids comprises a plurality of concave pyramids in an array; and tips of the convex pyramids face towards a light incidence direction, and recesses of the concave pyramids face towards the light incidence direction.

3. The LED backlight structure according to claim 1, wherein the reflection layer is on the backlight side of the transparent substrate, the reflection layer has a first via array of a plurality of first vias in one-to-one correspondence with the plurality of LEDs in the LED array, each LED in the LED array is within a respective one first via of the first via array, and the LEDs are configured to emit light to the light outgoing side of the LED backlight structure.

4. The LED backlight structure according to claim 3, further comprising a second microstructure layer between the reflection layer and the transparent substrate, wherein the second microstructure layer is configured to scatter light incident on a surface of the second microstructure layer, so that a part of the light passes through the second microstructure layer, and the rest of light is reflected by the second microstructure layer; the second microstructure layer has a second via array corresponding to the first via array, the plurality of first vias in the first via array are in one-to-one correspondence with a plurality of second vias in the second via array, and the plurality of first vias and the plurality of second vias are respectively overlapped with each other to form a plurality of stacked vias, and an LED in the LED array is in a corresponding one of the plurality of stacked vias.

5. The LED backlight structure according to claim 4, wherein the second microstructure layer is an array of convex pyramids or an array of concave pyramids made of a transparent resin;

the array of convex pyramids comprises a plurality of convex pyramids in an array, and the array of concave pyramids comprises a plurality of concave pyramids in an array; and tips of the convex pyramids face towards a light incidence direction, and recesses of the concave pyramids face towards the light incidence direction.

6. The LED backlight structure according to claim 1, wherein the reflection layer is on a side of the transparent encapsulation layer distal to the transparent substrate, and the transparent substrate and the transparent encapsulation layer are both between the reflection layer and the first microstructure layer.

7. The LED backlight structure according to claim 6, further comprising a second microstructure layer between the reflection layer and the transparent encapsulation layer, wherein the second microstructure layer is configured to scatter light incident on a surface of the second microstructure layer, so that a part of the light passes through the second microstructure layer, and the rest of light is reflected by the second microstructure layer.

8. The LED backlight structure according to claim 7, wherein the second microstructure layer is an array of convex pyramids or an array of concave pyramids made of a transparent resin;

the array of convex pyramids comprises a plurality of convex pyramids in an array, and the array of concave pyramids comprises a plurality of concave pyramids in an array; and tips of the convex pyramids face towards a light incidence direction, and recesses of the concave pyramids face towards the light incidence direction.

9. The LED backlight structure according to claim 3, wherein the first microstructure layer is on the other side of the transparent substrate without the LED array.

10. The LED backlight structure according to claim 9, further comprising a transflective film which is on a side of the first microstructure layer distal to the transparent substrate.

11. The LED backlight structure according to claim 1, wherein the reflection layer is on a side of the transparent substrate distal to the LED array, and the transparent substrate and the transparent encapsulation layer are both between the reflection layer and the first microstructure layer.

12. The LED backlight structure according to claim 11, wherein the first microstructure layer is on a side of the transparent encapsulation layer distal to the transparent substrate.

13. The LED backlight structure according to claim 12, further comprising a second microstructure layer between the reflection layer and the transparent substrate, wherein the second microstructure layer is configured to scatter light incident on a surface of the second microstructure layer, so that a part of the light passes through the second microstructure layer, and the rest of light is reflected by the second microstructure layer.

14. The LED backlight structure according to claim 13, wherein the second microstructure layer is an array of convex pyramids or an array of concave pyramids made of a transparent resin;

the array of convex pyramids comprises a plurality of convex pyramids in an array, and the array of concave pyramids comprises a plurality of concave pyramids in an array; and tips of the convex pyramids face towards a light incidence direction, and recesses of the concave pyramids face towards the light incidence direction.

15. The LED backlight structure according to claim 13, further comprising a transflective film which is on a side of the first microstructure layer distal to the encapsulation layer.

16. The LED backlight structure according to claim 2, wherein a period of the array of convex pyramids or the array of concave pyramids is 50 μm±10 μm and a distance between adjacent LEDs in the LED array is 4 mm±0.4 mm.

17. The LED backlight structure according to claim 5, wherein a period of the array of convex pyramids or the array of concave pyramids is 50 μm±10 μm and a distance between adjacent LEDs in the LED array is 4 mm±0.4 mm.

18. The LED backlight structure according to claim 15, further comprising a quantum dot layer, a prism, an upper diffuser, and a window sticker sequentially provided on a side of the transflective film distal to the transparent encapsulation layer.

19. A method for manufacturing the LED backlight structure according to claim 2, comprising:
- forming the first microstructure layer on the light outgoing side of the transparent substrate and the LED array by an imprint process.

20. The method for manufacturing the LED backlight structure according to claim 19, further comprising:
- forming a second microstructure layer on a side of the reflection layer proximate to the transparent substrate by the imprint process, wherein the second microstructure layer is configured to scatter light incident on a surface of the second microstructure layer, so that a part of the light passes through the second microstructure layer, and the rest of light is reflected by the second microstructure layer.

* * * * *